US012590215B2

(12) United States Patent
Nakamoto

(10) Patent No.: US 12,590,215 B2
(45) Date of Patent: Mar. 31, 2026

(54) INK FOR INK-JET TEXTILE PRINTING, METHOD FOR PRODUCING PRINTED MATTER USING SAID INK, AND ARTICLE WITH ADHERED IMAGE

(71) Applicant: NIPPON SHOKUBAI CO., LTD., Suita (JP)

(72) Inventor: Keiichi Nakamoto, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 125 days.

(21) Appl. No.: 18/572,608

(22) PCT Filed: May 13, 2022

(86) PCT No.: PCT/JP2022/020182
§ 371 (c)(1),
(2) Date: Dec. 20, 2023

(87) PCT Pub. No.: WO2022/270171
PCT Pub. Date: Dec. 29, 2022

(65) Prior Publication Data
US 2024/0294787 A1      Sep. 5, 2024

(30) Foreign Application Priority Data

Jun. 21, 2021    (JP) ................................. 2021-102640
May 11, 2022    (JP) ................................. 2022-078502

(51) Int. Cl.
| | |
|---|---|
| *C09D 11/30* | (2014.01) |
| *B41J 2/01* | (2006.01) |
| *B41J 2/21* | (2006.01) |
| *C09D 11/023* | (2014.01) |
| *C09D 11/106* | (2014.01) |
| *C09D 11/107* | (2014.01) |

(Continued)

(52) U.S. Cl.
CPC ................. *C09D 11/30* (2013.01); *B41J 2/01* (2013.01); *B41J 2/21* (2013.01); *B41J 2/2107* (2013.01); *C09D 11/023* (2013.01); *C09D 11/106* (2013.01); *C09D 11/107* (2013.01); *D06P 1/44* (2013.01); *D06P 1/5257* (2013.01); *D06P 1/90* (2013.01); *D06P 5/004* (2013.01); *D06P 5/30* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS 5,976,231 A * 11/1999 Schwarz ................ C09D 11/30
106/31.75
2009/0226682 A1      9/2009 Yatake
(Continued)

FOREIGN PATENT DOCUMENTS

| | | |
|---|---|---|
| JP | 2000-109733 A | 4/2000 |
| JP | 2009-215506 A | 9/2009 |

(Continued)

OTHER PUBLICATIONS

International Search Report issued in PCT/JP2022/020182; mailed Jul. 26, 2022.
(Continued)

*Primary Examiner* — Manish S Shah
(74) *Attorney, Agent, or Firm* — Studebaker Brackett PLLC

(57) ABSTRACT

An ink for ink-jet textile printing, the ink including a pigment, resin emulsion particles, an oxazoline-group-containing compound, and an aqueous medium, in which the resin emulsion particles have an average particle diameter of 150 nm or larger, a content of the resin emulsion particles is 10 to 20 mass % with respect to 100 mass % of the ink for ink-jet textile printing, and a content of the oxazoline-group-containing compound is contained in an amount of 0.5 to 10 mass % with respect to 100 mass % of the resin emulsion particles.

12 Claims, No Drawings

(51) Int. Cl.

| | |
|---|---|
| *D06P 1/44* | (2006.01) |
| *D06P 1/52* | (2006.01) |
| *D06P 1/90* | (2006.01) |
| *D06P 5/28* | (2006.01) |
| *D06P 5/30* | (2006.01) |

(56) References Cited

U.S. PATENT DOCUMENTS

| | | | | |
|---|---|---|---|---|
| 2011/0200751 A1* | 8/2011 | Yatake | C09D 11/54 | |
| | | | | 977/773 |
| 2013/0158177 A1* | 6/2013 | Ohzeki | C09D 11/322 | |
| | | | | 524/561 |
| 2014/0210901 A1* | 7/2014 | Ohashi | B41J 2/2107 | |
| | | | | 347/93 |
| 2014/0240399 A1* | 8/2014 | Saito | C09D 11/322 | |
| | | | | 347/44 |
| 2016/0244626 A1* | 8/2016 | Kagata | C09D 11/322 | |
| 2017/0210919 A1* | 7/2017 | Yoshimasa | C09D 11/322 | |
| 2018/0058002 A1* | 3/2018 | Ohashi | B41J 2/01 | |
| 2018/0094381 A1 | 4/2018 | Yagi et al. | | |
| 2018/0282567 A1* | 10/2018 | Ishida | C09D 11/322 | |
| 2020/0039245 A1 | 2/2020 | Akima et al. | | |
| 2020/0180337 A1 | 6/2020 | Ushiku et al. | | |
| 2020/0207136 A1* | 7/2020 | Miyasa | B41J 2/01 | |
| 2022/0081577 A1* | 3/2022 | Nakamoto | C09D 11/106 | |
| 2022/0315787 A1* | 10/2022 | Shimura | C09D 11/54 | |

FOREIGN PATENT DOCUMENTS

| | | | |
|---|---|---|---|
| JP | 2010-077381 | A | 4/2010 |
| JP | 2011-105805 | A | 6/2011 |
| JP | 2011-241306 | A | 12/2011 |
| JP | 2016-153233 | A | 8/2016 |
| JP | 2017-190369 | A | 10/2017 |
| JP | 2018-193442 | A | 12/2018 |
| JP | 2020-023168 | A | 2/2020 |
| JP | 2020-104362 | A | 7/2020 |
| WO | 2008/018406 | A1 | 2/2008 |
| WO | 2019/044673 | A1 | 3/2019 |

OTHER PUBLICATIONS

The extended European search report issued by the European Patent Office on Jan. 28, 2025, which corresponds to European Patent Application No. 228280905-1102 and is related to U.S. Appl. No. 18/572,608.

Communication Pursuant to Article 94(3) EPC issued by the European Patent Office on Oct. 30, 2025, which corresponds to EP 22 828 090.5-1102 and is related to U.S. Appl. No. 18/572,608.

An Office Action mailed by China National Intellectual Property Administration on Jun. 20, 2025, which corresponds to Chinese Patent Application No. 202280044071.4 and is related to U.S. Appl. No. 18/572,608; with English language translation.

\* cited by examiner

INK FOR INK-JET TEXTILE PRINTING, METHOD FOR PRODUCING PRINTED MATTER USING SAID INK, AND ARTICLE WITH ADHERED IMAGE

TECHNICAL FIELD

The present invention relates to an ink for ink-jet textile printing, a method for producing printed matter using the ink, and an article with an adhered image.

BACKGROUND ART

Nowadays, a method for textile printing by ink-jet printing with an ink containing a pigment as a colorant (method for obtaining a printed textile by ink-jet printing) is attracting attention. Inks for use in ink-jet printing are required to have performances peculiar to ink-jet printing, such as dispersion stability, ejection stability, and fixability to media. Inks for ink-jet textile printing, which are for use in methods for textile printing by ink-jet printing, are required to have performances such as printed-image fastness, e.g., rubbing fastness and washing fastness, and texture besides those performances. Under these circumstances, inks containing crosslinking agents, for example, are proposed in order to provide textile printing inks excellent in terms of fastness, etc. (for example, Patent Documents 1 and 2). Patent Document 1 and Patent Document 2 present Examples indicating that printed textiles obtained by applying the respective textile printing inks by ink-jet printing to a fabric made of 100% cotton, in Patent Document 1, or to a cotton fabric coated with a pretreatment liquid, in Patent Document 2, had excellent fastness, e.g., rubbing fastness. In each document, a heat treatment was conducted at 160° C. after the ink-jet printing.

In Patent Document 1, an aqueous resin dispersion (resin emulsion) and an oxazoline compound as a crosslinking agent (2) were used in Comparative Example 7. However, the content of resin emulsion particles (content of the solid component of the resin emulsion) was 2.6 mass %, far lower than 10 mass %, with respect to 100 mass % of the ink for ink-jet textile printing, and the content of the oxazoline-group-containing compound was 88 mass %, far higher than 10 mass %, with respect to 100 mass % of the resin emulsion particles. Patent Document 1 neither mentions nor suggests a feature of providing an ink for ink-jet textile printing which, when used in ink-jet textile printing, not only gives printed images having excellent rubbing fastness even when the ink-jet textile printing is conducted at low heating temperatures but also has excellent ejection stability.

Patent Document 2 also neither mentions nor suggests the feature of providing an ink for ink-jet textile printing which, when used in ink-jet textile printing, not only gives printed images having excellent rubbing fastness even when the ink-jet textile printing is conducted at low heating temperatures but also has excellent ejection stability. Furthermore, Patent Document 2 does not mention any oxazoline-group-containing compound.

CITATION LIST

Patent Literature

Patent Document 1: JP2009-215506A
Patent Document 2: JP2011-105805A

SUMMARY OF INVENTION

Technical Problems

In ink-jet textile printing, a heat treatment is preferably conducted either during or after the formation of an image by ink-jet printing in order to fix the image, but allowable temperatures vary depending on the materials of the fabrics. For cotton, the heat treatment can be conducted even at 160° C. However, allowable temperatures for many fabrics, e.g., ones composed of polyester fibers, are lower. It is hence expected to develop an ink for textile printing which is excellent in terms of the fastness of images to be obtained, etc., even when the heating temperature is lower. In addition, it is important in ink-jet textile printing that the ink should have excellent ejection stability during the printing, from the standpoint of the reproducibility of printed images.

An object of the present invention is to provide an ink for ink-jet textile printing which, when used in ink-jet textile printing, not only gives printed images having excellent rubbing fastness even when the ink-jet textile printing is conducted at low heating temperatures but also has excellent ejection stability.

Solution to the Problems

The present inventor directed attention to those problems and diligently made investigations on ink-jet textile printing inks for fabric printing. As a result, the inventor has found that an ink including a pigment, resin emulsion particles, and an aqueous medium can be made to not only give printed images with excellent rubbing fastness even when applied in ink-jet textile printing using a low heating temperature but also have excellent ejection stability during printing, by regulating the particle diameter and content of the resin emulsion particles to values in specific ranges and by incorporating a specific compound in a specific amount. The present invention has been thus completed.

Specifically, the ink for ink-jet textile printing of the present invention is an ink for ink-jet textile printing which includes a pigment, resin emulsion particles, an oxazoline-group-containing compound, and an aqueous medium and is characterized in that the resin emulsion particles have an average particle diameter of 150 nm or larger and are contained in an amount of 10 to 20 mass % with respect to 100 mass % of the ink for ink-jet textile printing, and the oxazoline-group-containing compound is contained in an amount of 0.5 to 10 mass % with respect to 100 mass % of the resin emulsion particles.

Advantageous Effects of Invention

Due to the configuration described above, the ink for ink-jet textile printing of the present invention has excellent ejection stability during printing and gives printed images with excellent rubbing fastness even when ink-jet printing is conducted using a low heating temperature. Because of this, by using the ink for ink-jet textile printing of the present invention in ink-jet printing of fabrics, etc., not only energy saving can be attained in a drying step but also printing (textile printing) including a step for forming an image with excellent rubbing fastness can be stably performed even on fabrics including polyester fibers or other materials having low heat-resistance temperatures.

DESCRIPTION OF EMBODIMENTS

The present invention is described in detail below.

Any combination of two or more of the preferred embodiments of the present invention described below is also a preferred embodiment of the present invention.

In this description, the term "(meth)acrylate" means "acrylate" or "methacrylate", and the term "(meth)acrylic" means "acrylic" or "methacrylic". There are cases when a (meth)acrylate is referred to as a (meth)acrylic acid ester.

In this description, the expression "heating temperature during ink-jet printing" means heating temperature in a heat treatment performed during or after image formation with an ink-jet device (ink-jet printer) in a method for textile printing with the ink-jet device. However, in cases when an image is formed with an ink-jet device while the fabric is being heated, that is, a heat treatment is conducted during image formation, and heating is not conducted after the image formation, then that expression means temperature for the heating during the image formation. In cases when an image is formed with an ink-jet device while the fabric is being heated and heating is conducted also after the image formation, then that expression means the higher of the two temperatures, i.e., the temperature for the heating during the image formation and the temperature for the heating after the image formation.

1. Ink for Ink-Jet Textile Printing

The ink for ink-jet textile printing of the present invention is an ink for ink-jet textile printing which includes a pigment, resin emulsion particles, an oxazoline-group-containing compound, and an aqueous medium and is characterized in that the resin emulsion particles have an average particle diameter of 150 nm or larger and are contained in an amount of 10 to 20 mass % with respect to 100 mass % of the ink for ink-jet textile printing, and the oxazoline-group-containing compound is contained in an amount of 0.5 to 10 mass % with respect to 100 mass % of the resin emulsion particles.

The ink for ink-jet textile printing of the present invention is referred to also as the ink of the present invention. The ink of the present invention can contain, according to need, any of the other ingredients which will be described later, besides the components mentioned above. The components constituting the ink of the present invention are described below <Pigment>

The ink of the present invention contains a pigment. Examples of the pigment include organic pigments and inorganic pigments, and one of these may be used alone or two or more thereof may be used in combination. According to need, any of those pigments can be used in combination with an extender pigment.

Examples of the organic pigments include azo pigments such as benzidine and Hansa Yellow, diazo pigments, azomethine pigments, methine pigments, anthraquinone pigments, phthalocyanine pigments such as Phthalocyanine Blue, perinone pigments, perylene pigments, diketopyrrolopyrrole pigments, thioindigo pigments, iminoisoindoline pigments, isoindolinone pigments such as iminoisoindolinone, dioxazine pigments, quinacridone pigments such as Quinacridone Red and Quinacridone Violet, flavanthrone pigments, indanthrone pigments, anthrapyrimidine pigments, carbazole pigments, Monoarylide Yellow, Diarylide Yellow, Benzoimidazolone Yellow, Tolyl Orange, Naphthol Orange, and quinophthalone pigments.

There are no particular limitations on hue, and use can be made of any of pigments of chromatic colors such as yellow, magenta, cyan, blue, red, orange, and green. Specific examples include C.I. name products of Pigment Yellow, Pigment Red, Pigment Orange, Pigment Violet, Pigment Blue, Pigment Green, etc. In the case where the ink is to be applied to a polypropylene fabric, it is preferred to use an organic pigment containing no metal from the standpoint of not promoting the pyrolysis of the polypropylene. Specifically, Pigment Blue 16 or the like can be selected.

Examples of the inorganic pigments include titanium dioxide, antimony trioxide, zinc oxides. e.g., zinc white, lithopone, lead white, red iron oxide, black iron oxide, chromium oxide green, carbon blacks, chrome yellow, molybdenum red, ferric ferrocyanide (Prussian Blue), ultramarine, and lead chromate. Examples of the inorganic pigments further include: pigments having a flat shape, such as mica, clay, aluminum powders, talc, and aluminum silicate; and extender pigments such as calcium carbonate, magnesium hydroxide, aluminum hydroxide, barium sulfate, and magnesium carbonate. Examples of the carbon blacks include furnace black, thermal lamp black, acetylene black, and channel black.

Preferred white pigments, among such inorganic pigments, are titanium dioxide, antimony trioxide, zinc oxides such as zinc white, lithopone, lead white, calcium carbonate, magnesium hydroxide, aluminum hydroxide, barium sulfate, magnesium carbonate, clay, talc, and aluminum silicate. Of these, titanium dioxide is preferred from the standpoints of high refractive index and excellent hiding property. Preferred of the titanium dioxide is one having a rutile crystal structure.

Preferred color pigments are the above-described organic pigments, red iron oxide, black iron oxide, chromium oxide green, carbon blacks, lead yellow, molybdenum red, ferric ferrocyanide (Prussian Blue), ultramarine, lead chromate, etc.

The pigment has an average particle diameter of desirably 10 to 1,000 nm, preferably 20 to 500 nm, from the standpoints of dispersion stability and of coloring property or hiding power.

In the case of a white pigment, the average particle diameter thereof is preferably 100 to 500 nm from the standpoint of excellent hiding property; the lower limit is more preferably 150 nm or larger, still more preferably 200 nm or larger, and the upper limit is more preferably 450 nm or less, still more preferably 400 nm or less.

In the case of a color pigment, the average particle diameter thereof is preferably 20 to 200 nm especially from the standpoint of coloring property; the lower limit is more preferably 40 nm or larger, still more preferably 50 nm or larger, and the upper limit is more preferably 150 nm or less, still more preferably 100 nm or less.

Those average particle diameters of the pigments are the average particle diameters in the ink of the present invention. An average particle diameter of a pigment can be determined with a laser diffraction/scattering type particle size distribution analyzer or by a dynamic light scattering method. For example, an examination is made using a particle size distribution analyzer (product No. FPAR-1000, manufactured by Otsuka Electronics Co., Ltd.) based on the dynamic light scattering method and a value obtained therefrom by a cumulant method can be employed. However, in the case where an examination by the dynamic light scattering method is difficult as of black pigments and the like, an examination is made with a laser diffraction/scattering type particle size distribution analyzer and a 50% particle diameter determined from the resultant volume-based particle size distribution can be employed as an average particle diameter.

The pigment in the ink of the present invention is preferably in the state of having been dispersed and stabilized with a dispersant. Examples of the dispersant include: poly((meth)acrylic acid (salt))s such as poly((meth)acrylic acid) and poly((meth)acrylic acid salt)s; copolymers of (meth) acrylic acid (salt) with one type or two or more types of monomers containing an ethylenically unsaturated double bond, such as (meth)acrylic acid esters, (meth)acrylonitrile, (meth)acrylamide, styrene, maleic acid, maleic anhydride, maleic acid esters, and vinyl acetate; poly(vinyl alcohol); and polyvinylpyrrolidone.

<Resin Emulsion Particles>

The resin emulsion particles contained in the ink of the present invention are described.

The resin emulsion particles, although not particularly limited, are preferably resin particles derived from an aqueous emulsion.

The shape of the resin emulsion particles are not particularly limited, but is usually spherical. The shape can be determined with a transmission electron microscope or a scanning electron microscope.

The resin emulsion particles have an average particle diameter of 150 nm or larger. Since the average particle diameter thereof is 150 nm or larger, it is easy to incorporate the resin emulsion particles in a high concentration while maintaining the viscosity of the ink in an appropriate range. The average particle diameter is more preferably 180 nm or larger, still more preferably larger than 200 nm, yet still more preferably 210 nm or larger. Meanwhile, although there is no particular upper limit, the average particle diameter is preferably 350 nm or less, more preferably 330 nm or less, still more preferably 300 nm or less.

In this description, the average particle diameter of resin emulsion particles is a value obtained by the cumulant method through an examination with a particle size distribution analyzer (product No. FPAR-1000, manufactured by Otsuka Electronics Co., Ltd.) based on the dynamic light scattering method.

The resin emulsion particle are not particularly limited in the glass transition temperature thereof. However, the glass transition temperature thereof is preferably 0° C. or lower, from the standpoint that printed textiles obtained using the ink of the present invention are apt to have excellent texture. The glass transition temperature thereof is more preferably −10° C. or lower, still more preferably −15° C. or lower. Meanwhile, although there is no particular lower limit, the glass transition temperature thereof is preferably −50° C. or higher, more preferably −40° C. or higher.

Those values of glass transition temperature can be ones obtained by any of differential scanning calorimetry (DSC), differential thermal analysis (DTA), and thermomechanical analysis (TMA). It is, however, preferred to employ values obtained by differential scanning calorimetry (DSC). Unless otherwise indicated, glass transition temperatures in this description are values obtained by differential scanning calorimetry (DSC).

However, in cases when a glass transition temperature can be determined by a calculation using the Fox equation from the composition of resinous components in the resin emulsion particles described later, as in the case of vinyl resins, (meth)acrylic resins, acrylic/styrene polymers, etc., the calculated value can be employed instead.

Examples of measuring devices for differential scanning calorimetry include product No. DSC220C, manufactured by Seiko Instruments Inc. In the examination by differential scanning calorimetry, there are no particular limitations on methods for drawing a differential scanning calorimetry (DSC) curve, methods for obtaining a primary differential curve from the differential scanning calorimetry (DSC) curve, methods for performing smoothing, methods for determining a desired peak temperature, etc. For example, in cases when that measuring device was used, a curve may be drawn from the data obtained by using the measuring device. When doing so, it is possible to use an analytical software capable of mathematical processing. Examples of the analytical software include analytical software EXSTAR6000, manufactured by Seiko Instruments Inc. With respect to examination conditions, it is preferred to conduct the examination at a heating rate of 15° C./min and a cooling rate of 15° C./min. Values obtained under such conditions are employed. Observed in the examination are a glass-transition initiation temperature, an intermediate temperature, a flex-point temperature, and a termination temperature. The intermediate temperature is taken as the glass transition temperature (Tg) of the resin emulsion particles.

Incidentally, the Fox equation is as follows.

$$1/Tg = \sum \left( Wm/Tgm \right)/100$$

In the equation, Tg represents glass transition temperature, Wm represents the content (mass %) of a monomer m in monomeric components constituting the resinous components, and Tgm represents the glass transition temperature (absolute temperature: K) of a homopolymer of the monomer m.

The content of each monomer with respect to the total amount of all monomers used for forming the resin of the resin emulsion particles and the glass transition temperature of the homopolymer of each monomer are substituted into the equation. Thus, the glass transition temperature can be determined. The glass transition temperatures of homopolymers which are usable in that method are, for example, as follows: homopolymer of acrylic acid, 95° C.; homopolymer of methacrylic acid, 130° C.; homopolymer of methyl methacrylate, 105° C.; homopolymer of styrene, 100° C.; homopolymer of cyclohexyl methacrylate, 83° C.; homopolymer of n-butyl methacrylate, 20° C.; homopolymer of 2-ethylhexyl acrylate, −70° C.; homopolymer of n-butyl acrylate, −56° C.'; homopolymer of hydroxyethyl methacrylate, 55° C.; homopolymer of acrylamide. 165° C.; homopolymer of 4-methacryloyloxy-1,2,2,6,6-pentamethylpiperidine, 130° C.

The resin emulsion particles preferably have acidic functional groups. Preferred of the acidic functional groups is a carboxy group (—COOH). The content of acidic functional groups is preferably 0.06 to 3 mass % with respect to 100 mass % of the resin emulsion particles. The content of acidic functional groups, in terms of the content of constituent units derived from monomers each having an acidic functional group, is preferably 0.1 to 5 mass % with respect to 100 mass % of the resin emulsion particles. Preferred ranges of the content of carboxy groups are the same as in the case of the acidic functional groups.

By regulating the content of carboxy groups and the content of acidic functional groups in the resin emulsion particles respectively to values within those ranges, the ink can be made to give printed images having excellent evenness and to give printed images with excellent washing fastness even when a low heating temperature is used in the ink-jet textile printing. The content of acidic functional groups, e.g., carboxy groups, in the resin emulsion particles can be regulated, for example, by regulating the composition of monomers to be used in polymerization for producing the resin emulsion particles.

The resin emulsion particles have an acid value of preferably 0.5 to 50 mgKOH/g, more preferably 0.8 to 40 mgKOH/g. A preferred range of the acid value due to carboxyl groups in the resin emulsion particles is the same as that of said acid value. By regulating the acid value of the resin emulsion particles and the acid value due to carboxy groups respectively to values within those ranges, the ink of the present invention can be made to give images having excellent evenness and to give images with excellent washing fastness even when a low heating temperature is used in the ink-jet textile printing.

The resinous components constituting the resin emulsion particles have a weight-average molecular weight of preferably 50.000 or higher, more preferably 300.000 or higher, still more preferably 550,000 or higher, especially preferably 600,000 or higher, from the standpoint of further improving the water resistance and adhesion. An upper limit of the weight-average molecular weight of the resinous components is preferably 5,000,000 or less from the standpoint of improving the film-forming properties and water resistance.

Those values of weight-average molecular weight are weight-average molecular weights (in terms of polystyrene) determined using a gel permeation chromatography [product No. HLC-8120GPC, manufactured by Tosoh Corp.; columns, TSKgel G-5000HXL and TSKgel GMHXL-L arranged serially].

The resin emulsion particles are not particularly limited in the structure thereof. Each particle may be even in composition throughout, or may have a core/shell structure composed of a core and a shell which differ in composition and/or property. The core/shell structure is not limited to a two-layer structure and may be composed of three or more layers. Preferred of these is a core/shell structure composed of two or more layers, which is capable of attaining an improved balance between the elongation and hardness of the coating film.

The resin emulsion particles have preferably been dispersed and stabilized with a surfactant. Examples of the surfactant include nonionic surfactants, anionic surfactants, cationic surfactants, and amphoteric surfactants, and conventionally known surfactants can be used. Any one of those surfactants may be used alone, or two or more thereof may be used in combination.

Preferred of those surfactants are nonionic surfactants or anionic surfactants. Also preferred is a surfactant having a polymerizable group in the molecule. Examples of the polymerizable group include groups each having an ethylenically unsaturated double bond. Especially preferred of those surfactants is a nonionic surfactant containing a polymerizable group or an anionic surfactant containing a polymerizable group. A surfactant containing a polymerizable group is referred to also as a reactive emulsifier. A polymeric emulsifier can be used as the surfactant.

Examples of the anionic surfactants include: alkyl sulfate salts such as ammonium dodecyl sulfate and sodium dodecyl sulfate; alkylsulfonate salts such as ammonium dodecylsulfonate, sodium dodecylsulfonate, and sodium alkyl (diphenyl ether)disulfonates; alkylarylsulfonate salts such as ammonium dodecylbenzenesulfonate and sodium dodecylnaphthalenesulfonate; polyoxyethylene alkylsulfonate salts; polyoxyethylene alkyl sulfate salts;

polyoxyethylene alkylaryl sulfate salts; dialkyl sulfosuccinate salts; arylsulfonic acid/formalin condensates; fatty acid salts such as ammonium laurate and sodium stearate; allyl-group-containing sulfuric acid esters or salts thereof, such as bis(polyoxyethylene polycyclic-phenyl ether) methacrylate sulfonate salts, propenyl alkyl sulfosuccinate salts, (meth)acrylic acid polyoxyethylenesulfonate salts, (meth)acrylic acid polyoxyethylenephosphonate salts, and sulfonate salts of allyloxymethylalkyloxypolyoxyethylenes; sulfuric acid ester salts of allyloxymethylalkoxyethylpolyoxyethylenes; and polyoxyalkylene alkenyl ether ammonium sulfate salts. However, the anionic surfactants are not limited to these examples.

Examples of the nonionic surfactants include polyoxyethylene alkyl ethers, polyoxyethylene alkylaryl ethers, condensates of poly(ethylene glycol) with poly(propylene glycol), sorbitan fatty acid esters, polyoxyethylene sorbitan fatty acid esters, fatty acid monoglycerides, condensates of ethylene oxide with an aliphatic amine, and polyoxyalkylene alkenyl ethers. However, the nonionic surfactants are not limited to these examples.

Examples of the cationic surfactants include alkylammonium salts such as dodecylammonium chloride. However, the cationic surfactants are not limited to these examples. Examples of the amphoteric surfactants include betaine ester type emulsifiers. However, the amphoteric surfactants are not limited to these examples.

Examples of the polymeric emulsifier include poly((meth) acrylic acid salt)s such as poly(sodium acrylate), poly(vinyl alcohol), polyvinylpyrrolidone, poly(hydroxyalkyl (meth) acrylate)s such as poly(hydroxyethyl acrylate), and copolymers including comonomer units derived from one or more type of the monomers constituting these polymers. However, the polymeric emulsifier is not limited to these examples.

Examples of the reactive emulsifier include propenyl alkyl sulfosuccinate salts, (meth)acrylic acid polyoxyethylenesulfonate salts, (meth)acrylic acid polyoxyethylenephosphonate salts (e.g., trade name Eleminol RS-30, manufactured by Sanyo Chemical Industries, Ltd.), polyoxyethylene (alkyl propenylphenyl ether)sulfonate salts (e.g., trade name Aqualon HS-10, manufactured by Dai-ich Kogyo Seiyaku Co., Ltd.), sulfonate salts of allyloxymethylalkyloxypolyoxyethylenes (e.g., trade name Aqualon KH-10, manufactured by Dai-ich Kogyo Seiyaku Co., Ltd.), polyoxyethylene styrenated propenyl phenyl ether sulfuric acid ester ammonium salts (e.g., trade name Aqualon AR-10, manufactured by Dai-ich Kogyo Seiyaku Co., Ltd.), polyoxyethylene styrenated propenyl phenyl ethers (e.g., trade name Aqualon AN-10, manufactured by Dai-ich Kogyo Seiyaku Co., Ltd.), sulfonate salts of allyloxymethylnonylphenoxyethylhydroxypolyoxyethylene (e.g., trade name ADEKA REASOAP SE-10, manufactured by ADEKA Corp.), allyloxymethylalkoxyethylhydroxypolyoxyethylene sulfuric acid ester salts (e.g., trade names ADEKA REASOAP SR-10 and SR-30, manufactured by ADEKA Corp.), bis(polyoxyethylene polycyclic-phenyl ether) methacrylated sulfonate salts (e.g., trade name Antox MS-60, manufactured by Nippon Nyukazai Co., Ltd.), allyloxymethylalkoxyethylhydroxypolyoxyethylene (e.g., trade name ADEKA REASOAP ER-20, manufactured by ADEKA Corp.), polyoxyethylene alkyl propenylphenyl ethers (e.g., trade name Aqualon RN-20, manufactured by Dai-ich Kogyo Seiyaku Co., Ltd.), and allyloxymethylnonylphenoxyethylhydroxypolyoxyethylene (e.g., trade name ADEKA REASOAP NE-10, manufactured by ADEKA Corp.). However, the reactive emulsifier is not limited to these examples.

The resin emulsion particles are made of a resin, which is not particularly limited. Examples of the resin include vinyl resins, (meth)acrylic resins, olefin-based resins, urethane-based resins, fluororesins, silicone resins, epoxy resins, phenoxy resins, phenol resins, and xylene resins.

Preferred of these are polymers each obtained by polymerizing one or more monomers containing an ethylenically unsaturated double bond. In other words, preferred are polymers each including constituent units derived from one or more monomers containing an ethylenically unsaturated double bond. In cases when the resin is a polymer obtained by polymerizing one or more monomers containing an ethylenically unsaturated double bond, then the content of acidic functional groups, e.g., carboxy groups, and a hydrophobic monomer can be designed at will.

Examples of the monomers containing an ethylenically unsaturated double bond include: vinyl monomers such as vinyl acetate, vinyl chloride, acrylonitrile, acrylamide, and vinyl benzoate; (meth)acrylic monomers such as (meth) acrylic acid esters and (meth)acrylic acid; styrene-based monomers such as styrene, α-methylstyrene, and chloromethylstyrene; and olefin monomers such as ethylene and propylene. Other examples include maleic acid, fumaric acid, crotonic acid, itaconic acid, citraconic acid, maleic anhydride, maleic acid monomethyl ester, maleic acid monobutyl ester, itaconic acid monomethyl ester, and itaconic acid monobutyl ester.

The resin of the resin emulsion particles is preferably a (co)polymer obtained by (co)polymerizing one type or two or more types of those monomers.

Examples thereof include vinyl acetate polymers, vinyl chloride polymers, ethylene/vinyl acetate copolymers, polystyrene, styrene/acrylonitrile copolymers, styrene/butadiene copolymers, acrylonitrile/butadiene/styrene copolymers, acrylonitrile/ethylene/styrene copolymers, acrylonitrile/chloroethylene/styrene copolymers, polyethylene, polypropylene, ethylene/propylene copolymers, ethylene/vinyl acetate/(meth)acrylic acid ester copolymers, (meth)acrylic acid ester copolymers, (meth)acrylic acid ester/(meth) acrylic acid copolymers, (meth)acrylic acid ester/styrene copolymers, (meth)acrylic acid ester/(meth)acrylic acid/styrene copolymers, ethylene/vinyl acetate/(meth)acrylic acid ester copolymers, (meth)acrylic acid ester/urethane copolymers, and acrylonitrile/(meth)acrylic acid ester/styrene copolymers.

Preferred of these is a copolymer obtained by copolymerizing a monomer composition at least including one type or two or more types of (meth)acrylic monomers and one type or two or more types of styrene-based monomers, as monomers containing an ethylenically unsaturated double bond, from the standpoint that this copolymer enables the ink of the present invention to be apt to give printed textiles excellent in terms of both rubbing fastness and texture when applied to fabrics including highly hydrophobic fibers. e.g., polypropylene fibers, as a main component. That copolymer is referred to also as an acrylic/styrene polymer. Examples of the acrylic/styrene polymer include (meth)acrylic acid ester/styrene copolymers, (meth)acrylic acid ester/(meth) acrylic acid/styrene copolymers, and acrylonitrile/(meth) acrylic acid ester/styrene copolymers.

The monomers for forming the acrylic/styrene polymer may include monomers other than (meth)acrylic monomers and styrene-based monomers. However, the total content of the (meth)acrylic monomers and the styrene-based monomers, with respect to 100 mass % in total of all the monomers for forming the acrylic/styrene polymer, is preferably 50 mass % or higher, more preferably 80 mass % or higher, still more preferably 95 mass % or higher, especially preferably 100 mass %.

In other words, the acrylic/styrene polymer is only required to include constituent units derived from a (meth) acrylic monomer and constituent units derived from a styrene-based monomer, and may contain constituent units other than these constituent units. However, the total content of the constituent units derived from a (meth)acrylic monomer and the constituent units derived from a styrene-based monomer, with respect to 100 mass % in total of all the constituent units constituting the acrylic/styrene polymer, is preferably 50 mass % or higher, more preferably 80 mass % or higher, still more preferably 95 mass % or higher, especially preferably 100 mass %.

As the (meth)acrylic monomers, use can be made of one type or two or more types of monomers selected from among conventionally known (meth)acrylic acid esters and (meth) acrylic acid.

Examples of the (meth)acrylic acid esters include: alkyl (meth)acrylates such as methyl (meth)acrylate, ethyl (meth) acrylate, n-propyl (meth)acrylate, isopropyl (meth)acrylate, n-butyl (meth)acrylate, isobutyl (meth)acrylate, tert-butyl (meth)acrylate, sec-butyl (meth)acrylate, 2-ethylhexyl (meth)acrylate, n-octyl (meth)acrylate, tridecyl (meth)acrylate, cyclohexyl (meth)acrylate, n-lauryl (meth)acrylate, dodecyl (meth)acrylate, stearyl (meth)acrylate, and isobornyl (meth)acrylate; fluoroalkyl (meth)acrylates such as trifluoroethyl (meth)acrylate, tetrafluoropropyl (meth)acrylate, and octafluoropentyl (meth)acrylate; aralkyl (meth)acrylates such as benzyl (meth)acrylate, phenylethyl (meth)acrylate, methylbenzyl (meth)acrylate, and naphthylmethyl (meth) acrylate; hydroxyalkyl (meth)acrylates such as 2-hydroxyethyl (meth)acrylate. 2-hydroxypropyl (meth)acrylate, 3-hydroxypropyl (meth)acrylate, 2-hydroxybutyl (meth)acrylate, and 4-hydroxybutyl (meth)acrylate; epoxy-group-containing (meth)acrylates such as glycidyl (meth)acrylate and α-methylglycidyl (meth)acrylate; alkoxyalkyl-group-containing (meth)acrylates such as methoxyethyl (meth)acrylate, methoxybutyl (meth)acrylate, ethoxybutyl (meth)acrylate, and trimethylolpropane tripropoxy(meth)acrylate; silyl-group-containing (meth)acrylates such as γ-(meth)acrylovloxypropyltrimethoxysilane, γ-(meth)acryloyloxypropylhydroxysilane, and γ-(meth)acryloyloxypropylmethylhydroxysilane; carbonyl-group-containing (meth)acrylates such as (meth)acryloxyalkylpropenal, acetonyl (meth)acrylate, diacetone (meth)acrylate, 2-hydroxypropyl (meth)acrylate acetylacetate. 1,4-butanediol acrylate acetylacetate, and 2-(acetoacetoxy)ethyl (meth)acrylate; aziridinyl-group-containing (meth)acrylates such as (meth)acryloylaziridine and 2-aziridinylethyl (meth)acrylate; oxo-group-containing (meth)acrylates such as (di)ethylene glycol (methoxy) (meth)acrylates, e.g., ethylene glycol (meth)acrylate, ethylene glycol methoxy(meth)acrylate, diethylene glycol (meth) acrylate, and diethylene glycol methoxy(meth)acrylate; and piperidine-group-containing (meth)acrylates such as 4-(meth)acryloyloxy-2,2,6,6-tetramethylpiperidine and 4-(meth)acryloyloxy-1,2,2,6,6-pentamethylpiperidine. One type or two or more types of these can be selected and used.

Also usable as the (meth)acrylic acid esters are polyfunctional (meth)acrylates. Examples of the polyfunctional (meth)acrylates include: di(meth)acrylates of polyhydric alcohols having 1 to 10 carbon atoms, such as ethylene glycol di(meth)acrylate, propylene glycol di(meth)acrylate. 1,3-butanediol di(meth)acrylate, 1,4-butanediol di(meth) acrylate, 1,6-hexanediol di(meth)acrylate, ethylene-oxidemodified 1,6-hexanediol di(meth)acrylate, 1,9-nonanediol di(meth)acrylate, propylene-oxide-modified neopentyl glycol di(meth)acrylate, and tripropylene glycol di(meth)acrylate; alkyl di(meth)acrylates in which the number of moles of an added alkylene oxide with 2 to 4 carbon atoms is 2 to 50, such as poly(ethylene glycol) di(meth)acrylate in which the number of moles of added ethylene oxide is 2 to 50, poly(propylene glycol) di(meth)acrylate in which the number of moles of added propylene oxide is 2 to 50, and tri(propylene glycol) di(meth)acrylate; tri(meth)acrylates of polyhydric alcohols having 1 to 10 carbon atoms, such as ethoxylated glycerin tri(meth)acrylate, propylene-oxide-modified glycerol tri(meth)acrylate, ethylene-oxide-modified trimethylolpropane tri(meth)acrylate, trimethylolpropane tri(meth)acrylate, pentaerythritol monohydroxytri(meth)acrylate, and trimethylolpropane triethoxytri(meth)acrylate; tetra(meth)acrylates of polyhydric alcohols having 1 to 10 carbon atoms, such as pentaerythritol tetra(meth)acrylate, dipentaerythritol tetra(meth)acrylate, and ditrimethylolpropane tetra(meth)acrylate; penta(meth)acrylates of polyhydric alcohols having 1 to 10 carbon atoms, such as pentaerythritol penta(meth)acrylate and dipentaerythritol (monohydroxy)penta(meth)acrylate; hexa(meth)acrylates of polyhydric alcohols having 1 to 10 carbon atoms, such as pentaerythritol hexa(meth)acrylate, bisphenol A di(meth)acrylate, 2-(2'-vinyloxyethoxyethyl) (meth)acrylate, and epoxy-group-containing (meth)acrylates such as epoxy (meth)acrylate; and polyfunctional (meth)acrylates such as urethane (meth)acrylates.

The (meth)acrylic acid is preferably acrylic acid or methacrylic acid.

Examples of the styrene-based monomers include styrene, α-methylstyrene, p-methylstyrene, tert-butylstyrene, chlorostyrene, vinyltoluene, and 2-styrylethyltrimethoxysilane. Also usable styrene-based monomers are ones which each include a benzene ring having thereon an alkyl group, e.g., a methyl or tert-butyl group, or a functional group, e.g., a nitro, nitrile, alkoxy, acyl, sulfone, or hydroxyl group or a halogen atom. Of such styrene-based monomers, styrene is preferred from the standpoint of enhancing the water resistance Also usable as the styrene-based monomers are polyfunctional styrene-based monomers. Preferred examples of the polyfunctional styrene-based monomers include divinylbenzene.

The content of the styrene-based monomer(s) in the monomers for forming the acrylic/styrene polymer is preferably 1 to 55 mass %, more preferably 5 to 50 mass %, still more preferably 10 to 45 mass %, with respect to 100 mass % in total content of the acrylic monomer(s) and the styrene-based monomer(s). By regulating the content of the styrene-based monomer(s) to a value within that range, the ink is made to be apt to give printed textiles having even better texture or having excellent washing fastness.

The acrylic/styrene polymer is preferably a polymer obtained by copolymerizing a monomer composition including the (meth)acrylic monomer(s) and the styrene-based monomer(s) preferably in a ratio within that range.

The acrylic/styrene polymer is preferably a polymer having carboxy groups, and the content of carboxy groups is preferably 0.06 to 3 mass % with respect to 100 mass % of the resin emulsion particles. The content of carboxy groups, in terms of the content of constituent units derived from a monomer having a carboxy group, with respect to 100 mass % of the resin emulsion particles, is preferably 0.1 to 5 mass %.

The carboxy groups are preferably carboxy groups derived from (meth)acrylic acid. It is hence preferable that the constituent units derived from a (meth)acrylic monomer which are a constituent component of the acrylic/styrene polymer include one type or two or more types of constituent units derived from (meth)acrylic acid. More preferably, the constituent units include both one type or two or more types of constituent units derived from any of the (meth)acrylate esters and one type or two or more types of constituent units derived from (meth)acrylic acid.

The content of the constituent units derived from (meth)acrylic acid which are a constituent component of the acrylic/styrene polymer is preferably 0.1 to 5 mass %, more preferably 0.2 to 4 mass %, still more preferably 1 to 3 mass %, with respect to 100 mass % in total content of the constituent units derived form a (meth)acrylic monomer and the constituent units derived from a styrene-based monomer.

The (meth)acrylic monomers for forming the acrylic/styrene polymer preferably include one type or two or more types of (meth)acrylic acid, and more preferably include one type or two or more types of the (meth)acrylate esters and one type or two or more types of (meth)acrylic acid.

The content of (meth)acrylic acid in the monomers for forming the acrylic/styrene polymer is preferably 0.1 to 5 mass %, more preferably 0.2 to 4 mass %, still more preferably 1 to 3 mass %, with respect to 100 mass % in total content of the (meth)acrylic monomers and the styrene-based monomers.

The (meth)acrylic monomers for forming the acrylic/styrene polymer preferably include (meth)acrylic acid esters besides (meth)acrylic acid. Preferred of the (meth)acrylic acid esters to be included are one type or two or more types of alkyl (meth)acrylates and one type or two or more types of hydroxyalkyl (meth)acrylates. More preferably, the (meth)acrylic monomers include both one type or two or more types of alkyl (meth)acrylates and one type or two or more types of hydroxyalkyl (meth)acrylates.

Preferred of the alkyl (meth)acrylates to be included are alkyl (meth)acrylates in which the alkyl groups each have 1 to 18 carbon atoms. More preferred of these are alkyl (meth)acrylates in which the alkyl groups each have 4 to 12 carbon atoms. Also preferred is a mode in which two or more of those alkyl (meth)acrylates which differ in the number of carbon atoms are used in combination. Examples thereof include: a mode in which an alkyl (meth)acrylate in which the alkyl group has 1 to 5 carbon atoms and an alkyl (meth)acrylate in which the alkyl group has 6 to 18 carbon atoms are used in combination; a mode in which the alkyl (meth)acrylate in which the alkyl group has one carbon atom and an alkyl (meth)acrylate in which the alkyl group has 8 to 18 carbon atoms are used in combination; a mode in which the alkyl (meth)acrylate in which the alkyl group has one carbon atom, an alkyl (meth)acrylate in which the alkyl group has 4 to 6 carbon atoms, and an alkyl (meth)acrylate in which the alkyl group has 8 to 18 carbon atoms are used in combination; and a mode in which an alkyl (meth)acrylate in which the alkyl group has 2 to 6 carbon atoms and an alkyl (meth)acrylate in which the alkyl group has 8 to 12 carbon atoms are used in combination. The hydroxyalkyl (meth)acrylates are more preferably hydroxyalkyl (meth)acrylates in which the hydroxyalkyl chains each have 1 to 18 carbon atoms, still more preferably hydroxyalkyl (meth)acrylates in which the hydroxyalkyl chains each have 2 to 4 carbon atoms.

The monomers for forming the acrylic/styrene polymer may include monomers other than the (meth)acrylic monomers and styrene-based monomers. Examples of the other monomers include acrylonitrile, vinyl acetate, and acrylamide. Examples of the other monomers further include addition-polymerizable oxazolines Examples of the addition-polymerizable oxazolines include 2-vinyl-2-oxazoline, 2-vinyl-4-methyl-2-oxazoline, 2-vinyl-5-methyl-2-oxazoline. 2-isopropenyl-2-oxazoline, 2-isopropenyl-4-methyl-2-oxazoline. 2-isopropenyl-5-methyl-2-oxazoline, and 2-isopropenyl-5-ethyl-2-oxazoline.

The acrylic/styrene polymer is preferably one obtained by copolymerizing two or more of the preferred monomers in a preferred proportion, and is preferably a polymer including constituent units derived from the preferred monomers in a proportion corresponding to the preferred monomer proportion.

The resin emulsion particles as a constituent component of the ink of the present invention are preferably ones which include the acrylic/styrene polymer as a main component of the resin. These particles are referred to also as acrylic/styrene polymer emulsion particles.

Preferred embodiments of the resin emulsion particles as a constituent component of the ink of the present invention were explained above with respect to the shape, average particle diameter, glass transition temperature, content of acidic functional groups, content of carboxy groups, and acid value of the particles, the weight-average molecular weight, the structure of the particles, surfactants, etc. These preferred embodiments can be applied as such to the acrylic/styrene polymer emulsion particles.

The acrylic/styrene polymer emulsion particles can be produced by a conventionally known emulsion polymerization method. The kinds of preferred monomers, combinations and proportions thereof, etc. in the emulsion polymerization are the same as in the preferred modes or embodiments explained above with respect to the monomers for forming the acrylic/styrene polymer. That is, the acrylic/styrene polymer emulsion particles can be produced by emulsion-polymerizing monomers including a (meth)acrylic monomer and a styrene-based monomer and optionally further including other monomers containing an ethylenically unsaturated double bond, in an aqueous medium in the presence of an emulsifier. The emulsifier to be used can be a conventionally known emulsifier. The emulsifier to be used can be any of the surfactants mentioned above, and preferred embodiments thereof are the same as the preferred embodiments of the surfactants.

In the emulsion obtained by the emulsion polymerization method, the content of residual monomers is preferably less than 100 mass ppm of the emulsion. The content of residual monomers can be determined, for example, by gas chromatography. It is preferred to supplementally add a polymerization initiator and prolong maturation after the polymerization reaction so that the emulsion has a residual monomer content less than 100 ppm after the maturation.

<Oxazoline-Group-Containing Compound>

The ink of the present invention contains an oxazoline-group-containing compound.

The term "oxazoline-group-containing compound" in the present invention means a compound having two or more oxazoline groups in the molecule. Examples of the oxazoline-group-containing compound include 2,2'-bis(2-oxazoline), 2,2'-methylenebis(2-oxazoline). 2,2'-ethylenebis(2-oxazoline), 2,2'-trimethylenebis(2-oxazoline), 2,2'-tetramethylenebis(2-oxazoline), 2,2'-hexamethylenebis(2-oxazoline), 2,2'-octamethylenebis(2-oxazoline), 2,2'-ethylenebis(4,4'-dimethyl-2-oxazoline), 2,2'-p-phenylenebis(2-oxazoline), 2,2'-m-phenylenebis(2-oxazoline), 2,2'-m-phenylenebis(4,4'-dimethyl-2-oxazoline), bis(2- oxazolinylcyclohexane) sulfide, bis(2-oxazolinylnorbomane) sulfide, and oxazoline-group-containing polymers. However, the oxazoline-group-containing compound is not limited to these examples. Any one of these oxazoline-group-containing compounds may be used alone, or two or more thereof may be used in combination.

Of the oxazoline-group-containing compounds, water-soluble oxazoline-group-containing compounds are preferred from the standpoint that these compounds have excellent crosslinking performance. Also preferred are oxazoline-group-containing polymers. The oxazoline-group-containing polymers can be produced by conventionally known production methods. Examples of the methods include a method in which a monomer ingredient including one type or two or more types of addition-polymerizable oxazolines or including both an addition-polymerizable oxazoline and a monomer copolymerizable with the addition-polymerizable oxazoline is polymerized. The copolymerizable monomer is preferably a monomer which has no functional group reactive with an oxazoline group and is copolymerizable with the addition-polymerizable oxazoline. Examples thereof include the aforementioned monomers containing an ethylenically unsaturated double bond which have no functional group reactive with an oxazoline group. Examples thereof include: vinyl monomers such as vinyl acetate, vinyl chloride, acrylonitrile, acrylamide, and vinyl benzoate; (meth)acrylic monomers such as (meth)acrylic acid esters; styrene-based monomers such as styrene, α-methylstyrene, and chloromethylstyrene; and olefin monomers such as ethylene and propylene.

Examples of the addition-polymerizable oxazolines include 2-vinyl-2-oxazoline. 2-vinyl-4-methyl-2-oxazoline, 2-vinyl-5-methyl-2-oxazoline, 2-isopropenyl-2-oxazoline. 2-isopropenyl-4-methyl-2-oxazoline, 2-isopropenyl-5-methyl-2-oxazoline, and 2-isopropenyl-5-ethyl-2-oxazoline.

Preferred of the oxazoline-group-containing polymers are water-soluble oxazoline-group-containing polymers, which can be produced by the same method as that for producing the oxazoline-group-containing polymers. Examples of the water-soluble oxazoline-group-containing polymers include a polymer composed of a main chain which is an acrylic polymer, an acrylic/styrene polymer, or the like and side chains containing oxazoline groups.

Commercial products of oxazoline-group-containing polymers can be used. Examples thereof include water-soluble polymers such as trade names Epocros WS-500 and Epocros WS-700, manufactured by Nippon Shokubai Co., Ltd., and emulsion type polymers such as Epocros K-2010, Epocros K-2020, and Epocros K-2030, manufactured by Nippon Shokubai Co., Ltd. Preferred of these are trade names Epocros WS-500 and Epocros WS-700, manufactured by Nippon Shokubai Co., Ltd., which are water-soluble polymers.

The content of the oxazoline-group-containing compound in the ink of the present invention is 0.5 to 10 mass % with respect to 100 mass % of the resin emulsion particles. That range is preferred mainly from the standpoint of rubbing fastness. The content thereof is preferably 5 mass % or less.

It is presumed that the oxazoline-group-containing compound interacts or chemically reacts with a component contained in the ink of the present invention, e.g., the resin emulsion particles, the pigment, or a dispersant for the pigment, to thereby function like a crosslinking agent even at low temperatures and form tough coating films.

<Aqueous Medium>

The ink of the present invention includes an aqueous medium. The term "aqueous medium" in the present invention means a solvent including water. The content of water in the aqueous medium is preferably 10 to 100 mass %. The water content is more preferably 25 mass % or higher, still more preferably 60 mass % or higher, especially preferably 90 mass % or higher. The remainder is preferably an organic solvent.

The aqueous medium can contain an organic solvent. Examples of the organic solvent include: glycols such as propylene glycol, 1,3-propanediol, glycerin, dipropylene glycol, tripropylene glycol, diethylene glycol, triethylene glycol, and tetraethylene glycol; ethers of monoethylene glycol, such as monoethylene glycol monomethyl ether, monoethylene glycol monoethyl ether, monoethylene glycol monopropyl ether, monoethylene glycol monoisopropyl ether, monoethylene glycol monobutyl ether, and monoethylene glycol monoisobutyl ether; ethers of monopropylene glycol, such as monopropylene glycol monomethyl ether, monopropylene glycol monoethyl ether, monopropylene glycol monopropyl ether, monopropylene glycol monoisopropyl ether, monopropylene glycol monobutyl ether, and monopropylene glycol monoisobutyl ether; ethers of poly (ethylene glycol), such as the monomethyl ether of poly (ethylene glycol) (number of moles of added EO=2 to 10, preferably 2 to 4), the monoethyl ether of poly(ethylene glycol) (number of moles of added EO=2 to 10, preferably 2 to 4), the monopropyl ether of poly(ethylene glycol) (number of moles of added EO=2 to 10, preferably 2 to 4), the monoisopropyl ether of poly(ethylene glycol) (number of moles of added EO=2 to 10, preferably 2 to 4), the monobutyl ether of poly(ethylene glycol) (number of moles of added EO=2 to 10, preferably 2 to 4), and the monoisobutyl ether of poly(ethylene glycol) (number of moles of added EO=2 to 10, preferably 2 to 4); ethers of poly(propylene glycol), such as the monomethyl ether of poly(propylene glycol) (number of moles of added EO=2 to 10, preferably 2 to 4), the monoethyl ether of poly(propylene glycol) (number of moles of added EO=2 to 10, preferably 2 to 4), the monopropyl ether of poly(propylene glycol) (number of moles of added EO=2 to 10, preferably 2 to 4), the monoisopropyl ether of poly(propylene glycol) (number of moles of added EO=2 to 10, preferably 2 to 4), the monobutyl ether of poly(propylene glycol) (number of moles of added EO=2 to 10, preferably 2 to 4), and the monoisobutyl ether of poly(propylene glycol) (number of moles of added EO=2 to 10, preferably 2 to 4); and heterocyclic compounds such as 2-pyrrolidone and N-methyl-2-pyrrolidone.

Preferred of these are propylene glycol, glycerin, diethylene glycol, triethylene glycol, diethylene glycol monoisopropyl ether, diethylene glycol monobutyl ether, diethylene glycol monoisobutyl ether, triethylene glycol monobutyl ether, the monobutyl ether of polyethylene glycol) (number of moles of added EO=2 to 4), and 2-pyrrolidone. More preferred are propylene glycol, triethylene glycol, the monobutyl ether of poly(ethylene glycol) (number of moles of added EO=2 to 4), and 2-pyrrolidone. Any one of these organic solvents may be used alone, or two or more thereof may be used in combination.

<Composition>

The content of the resin emulsion particles in the ink of the present invention is 10 to 20 mass % per 100 mass % the ink. That range is preferred from the standpoint of improving both the rubbing fastness of images formed through a low-temperature heat treatment during the ink-jet textile printing and the ejection stability of the ink during printing. The content thereof is preferably 10.5 mass % or higher but 18.0 mass % or less.

The content of the pigment in the ink of the present invention is not particularly limited, but is preferably 1 to 20 mass per 100 mass % the ink. In case where the content of the pigment is less than 1 mass %, there is a possibility that the ink might be insufficient in coloring property or hiding property. In case where the content thereof exceeds 20 mass %, there is a possibility that a decrease in texture might result. The content of the pigment is more preferably 2 mass % or higher but 18 mass % or less.

The content of the aqueous medium in the ink of the present invention is preferably 55 to 89 mass %, more preferably 70 to 85 mass %, with respect to 100 mass % of the ink of the present invention.

In the ink of the present invention, the content of the pigment with respect to 100 mass % in total content of the pigment, the resin emulsion particles, and the oxazoline-group-containing compound, is preferably 10 to 80 mass %, more preferably 15 to 75 mass %, from the standpoint of improving the hiding properties or coloration of formed or printed images.

<Other Ingredients>

The ink of the present invention may contain ingredients other than the essential components described above (the pigment, the resin emulsion particles, the aqueous medium), unless the inclusion thereof defeats the object of the present invention. For example, the ink may contain additives such as a surfactant, dispersant, leveling agent, ultraviolet absorber, ultraviolet stabilizer, thickener, wetting agent, plasticizer, stabilizer, antifoaming agent, dye, antioxidant, crosslinking accelerator, PH regulator, and antiseptic in appropriate amounts. Preferably used as the leveling agent are, for example, surfactants based on acetylene glycol, silicones, or fluorochemicals. Preferred of these are polyether-modified silicone compounds.

In the case of adding any of those other ingredients, the content thereof is not particularly limited, but is desirably 2 mass % or less, preferably 1 mass % or less, with respect to 100 mass % of the ink of the present invention. From the standpoint of producing the effect of the addition, the content is preferably 0.01 mass % or higher, more preferably 0.05 mass % or higher.

<Method for Producing the Ink for Ink-Jet Textile Printing of the Invention>

Methods for producing the ink of the present invention are not particularly limited. Although the ink can be produced, for example, by mixing a pigment, resin emulsion particles, an oxazoline-group-containing compound, and an aqueous medium, the following is a preferred production example.

First, an emulsion containing resin emulsion particles and a pigment dispersion are prepared. The pigment dispersion is preferably one obtained by dispersing a pigment in an aqueous medium. The pigment dispersion can be produced, for example, by mixing an aqueous medium. e.g., water, with a pigment and a dispersant and subjecting the mixture to a dispersing treatment with a bead mill or the like. The content of the pigment in the pigment dispersion is not particularly limited, but is preferably 15 to 65 mass % with respect to 100 mass % of the pigment dispersion. Meanwhile, the emulsion containing resin emulsion particles can be produced by a conventionally known emulsion polymerization method as stated above. The content of the resin emulsion particles in the emulsion is not particularly limited, but is preferably 30 to 65 mass % with respect to 100 mass % of the emulsion. Although emulsions obtained by emulsion polymerization methods usually contain emulsifying agents, e.g., surfactants, used for emulsification, such an emulsion as such may be used as the emulsion for producing the ink of the present invention.

Next, the pigment dispersion, the emulsion, an oxazoline-group-containing compound are mixed together optionally together with an aqueous medium. In the mixing, the oxazoline-group-containing compound may be used as such, or a solution obtained by diluting the compound with, for example, an aqueous medium may be used. There are no particular limitations on methods for mixing those ingredients or on the sequence of mixing. For example, use may be made of: a method in which the emulsion is mixed with the pigment dispersion before the oxazoline-group-containing compound is mixed therewith; a method in which the pigment dispersion is mixed with the oxazoline-group-containing compound before the emulsion is mixed therewith; a method in which the emulsion is mixed with the oxazoline-group-containing compound before the pigment dispersion is mixed therewith, and a method in which the pigment dispersion, the emulsion, and the oxazoline-group-containing compound are mixed together substantially simultaneously.

An aqueous medium may be mixed or one of or a mixture of the components of the aqueous medium, i.e., water and an organic solvent, may be mixed, for the purpose of regulating the concentration of each component in the ink of the present invention or for the purpose of regulating the properties of the ink. Ingredients, e.g., additives, other than those mentioned above may be further mixed. The timing of mixing these ingredients (aqueous medium, additives, etc.) may be appropriately selected. Centrifuging, filtration with a filter, etc. can be conducted according to need.

By the production method described above is obtained an ink of the present invention which includes the pigment, resin emulsion particles, oxazoline-group-containing compound, and aqueous medium and which further contains other ingredients, e.g., additives, according to need.

The ink of the present invention described above is suitable for use in printing fabrics using ink-jet printers. Using the ink of the present invention in ink-jet textile printing can give articles which are fabrics having any desired images, e.g., characters, designs, or drawings, printed thereon. Due to the configuration described above, the ink for ink-jet textile printing of the present invention gives printed images having excellent rubbing fastness, even when a low heating temperature is used for the ink-jet textile printing. Because of this, use of the ink of the present invention in ink-jet printing on fabrics or other textiles not only attains energy saving in the drying step but also makes it possible to form and print images with excellent rubbing fastness even on fabrics including materials having low heat-resistance temperatures, such as, for example, polypropylene fibers and polyester fibers.

2. Method for Producing Printed Matter Including Fabric Having Image Printed Thereon Various methods can be used for producing printed matter (textile) using the ink for ink-jet textile printing of the present invention. A preferred production method among those production methods is explained. The production method is a method for producing printed matter including a fabric having an image printed thereon, the method including an image formation step in which the ink for ink-jet textile printing of the present invention is adhered to the fabric with an ink-jet printer to form the image. This production method is referred to also as the printed-matter production method of the present invention. A transfer textile printing method in which the ink for ink-jet textile printing of the present invention is used can also be employed. The transfer textile printing method can be a conventionally known method. Examples of the transfer textile printing method include a method including: a transfer-paper production step in which the ink for ink-jet textile printing of the present invention is ejected onto a transfer-paper base using an ink-jet printer and dried according to need, thereby producing a transfer paper having an image formed thereon; a transfer step in which the transfer paper produced in the transfer-paper production step is superposed on a fabric and the stack is heated and/or pressed, thereby transferring the image formed on the transfer paper to the fabric; and a peeling step in which the transfer paper is peeled from the fabric to which the image has been transferred in the transfer step.

In this description, the term "fabric" means any of all textile products, including cloth, woven fabric, etc., formed from natural fibers and/or synthetic fibers. Examples thereof include woven fabric, nonwoven fabric, and knitted fabric. The fibers constituting the fabric are also not particularly limited, and examples thereof include natural fibers, chemical fibers, and mixtures of these.

Preferred examples of the natural fibers include silk, cotton, and wool. Examples of the chemical fibers include synthetic fibers, regenerated fibers, and semisynthetic fibers. Preferred examples of the synthetic fibers include polyester fibers, nylon fibers, acrylic fibers, polyurethane fibers, polyethylene fibers, polypropylene fibers, and Vinylon fibers. Preferred examples of the regenerated fibers include rayon. Preferred examples of the semisynthetic fibers include acetate and triacetate.

Preferred are fabrics respectively including cotton, polyester fibers, and polypropylene fibers among those. As will be described later, preferred heat-treatment temperatures vary depending on the kinds of fibers constituting the fabrics. Even when fabrics which include polyester fibers as a main component or include polypropylene fibers as a main component and for which a low heat-treatment temperature should be used, printed textiles having excellent rubbing fastness can be produced by using the ink of the present invention. Even in the case of fabrics for which a heat treatment has conventionally been performed at 160° C. in order to fix images and ensure fastness, like cotton fabrics, use of the ink of the present invention makes it possible to produce printed textiles with excellent fastness even through treatments at lower heating temperatures.

The ink-jet printers to be used in the image formation step and the transfer-paper production step are not particularly limited, and conventionally known ink-jet printers can be used. The ink-jet printers may be, for example, any of printers operating in the piezoelectric mode, thermal mode, charge change control mode (continuous-jet mode), etc. Especially preferred are piezoelectric-mode ink-jet printers. In the case of using a piezoelectric-mode ink-jet printer, there are no particular limitations on ink ejection conditions, etc., and suitable conditions may be selected in accordance with the properties of the ink of the present invention, kind of the fabric, kind of the image to be printed, etc. The ink for ink-jet textile printing of the present invention has a viscosity preferably in the range of 2 to 20 mPa/s. The ink has a surface tension preferably in the range of 25 to 45 mN/m.

In the image formation step and the transfer-paper production step, the ink of the present invention which has been ejected from the nozzle openings of an ink-jet printer head adheres respectively to the fabric surface and the transfer-paper base to form images.

The printed-matter production method of the present invention preferably includes a step (referred to also as a heat treatment step) in which the fabric having the image formed thereon in the image formation step is heated at a temperature higher than room temperature. Meanwhile, the transfer textile printing method preferably includes a step (referred to also as a heat treatment step) in which the fabric having the image transferred thereto from the transfer paper in the transfer step is heated at a temperature higher than room temperature. The heat treatment at a temperature higher than room temperature can accelerate removal of ink-derived volatile components, e.g., the aqueous medium, contained in the image formed on the fabric and can accelerate the fixing of the image. In addition, the heat treatment promotes film formation (fusion bonding) from the resin emulsion particles contained in the ink and thereby improves the adhesion of the image, etc. Moreover, a reaction for yielding the reaction product (C) which will be described later is apt to proceed.

The heat treatment step may be conducted either simultaneously with the image formation step or transfer step or after the image formation step or transfer step, or the two methods may be used in combination. Examples of methods for conducting the heat treatment step simultaneously with the image formation step or transfer step include a method in which the image formation step or transfer step is conducted while the fabric is being heated. Preferred examples of heat treatment methods in the case of conducting the heat treatment step after the image formation step or transfer step include: heating with a drying oven; heating with a hot press; heating with an infrared lamp; and a method in which steam, such as ordinary-pressure steam or high-pressure steam, is used. A preferred heating method among these is to conduct the heat treatment step after the image formation step or transfer step since there is a possibility that simultaneously conducting the two steps might result in a disordered stream.

The temperature for heating in each heat treatment step is preferably 90 to 180° C. The upper limit is more preferably 150° C. or lower, still more preferably 130° C. or lower, especially preferably 120° C. or lower, and the lower limit is more preferably 95° C. or higher, still more preferably 100° C. or higher. In the heat treatment step, recommended heating temperatures and heating periods vary depending on the fibers constituting the fabric. For example, the temperatures are 160° C. for cotton. 125° C. for polypropylene, and 110° C. for polyester, and the periods for all these materials are 5 minutes or less, preferably 3 minutes or less, more preferably 2 minutes or less. The printed textile (printed matter obtained by forming an image on the fabric) obtained through the heat treatment step may be washed with water and dried.

By the printed-matter production method of the present invention and the transfer textile printing method, in which the ink for ink-jet textile printing of the present invention is used, a printed textile (printed matter including a fabric having an image formed thereon) in which the printed image has excellent rubbing fastness can be produced with reduced energy consumption environmentally friendlily even when a low heating temperature is used.

From the standpoint of obtaining a printed textile with excellent rubbing fastness in a short time period, the heating temperature is preferably 90° C. or higher as stated above. However, heating temperatures in the heat treatment step are not limited to that range, and may be, for example, temperatures, e.g., 15 to 25° C., around ordinary temperature. Even by the heat treatment at such a temperature, the rubbing fastness of the printed image can be improved by conducting the heating for a long period. From the standpoint of reducing the heating period, the temperature is preferably 30° C. or higher, more preferably 50° C. or higher, still more preferably 90° C. or higher.

The ordinary temperature is, for example, 15 to 25° C., and room temperature, which is the actual temperature of the inside of the room, is usually regarded as about 15 to 25° C.

In this description, printing is only required to include an image formation step in which an ink for ink-jet textile printing is adhered to a fabric using an ink-jet printer to form an image. Images printed by the printed-matter production method of the present invention and the transfer textile printing method, in which the ink for ink-jet textile printing of the present invention is used, may have undergone a heat treatment performed at a temperature higher than room temperature or may not have undergone any heat treatment performed at a temperature higher than room temperature.

3. Article with Printed Image and Article with Adhered Image

The present invention further provides an article with a printed image. The article with a printed image provided by the present invention is an article obtained by forming a printed image from the ink for ink-jet textile printing of the present invention on some or all of a fabric, wherein the printed image includes a pigment and a resin, and the resin includes a product (C) of reaction between an acrylic/styrene polymer (A) having a carboxy group and an oxazoline-group-containing compound (B). The printed image is preferably one in which the resin serves as a binder and the pigment is dispersed and contained therein. The ink for ink-jet textile printing preferably contains the acrylic/styrene polymer (A) having a carboxy group.

The reaction product (C) is yielded through ordinary-temperature drying even when the ink is not heated at a temperature higher than room temperature. The higher the temperature, the more the reaction proceeds. Although the rate of yielding the reaction product (C) is higher when the ink is heated at a temperature higher than room temperature, the reaction product (C) is thought to be yielded even in ordinary-temperature drying little by little with the lapse of time.

The present invention furthermore provides an article with an adhered image. The article with an adhered image provided by the present invention is an article which includes a fabric and the image, the image being adherent to some or all of the fabric and including a pigment and a resin, and which is characterized in that the resin includes a product (C) of reaction between an acrylic/styrene polymer (A) having a carboxy group and an oxazoline-group-containing compound (B). The adhered image includes a pigment and a resin. The adhered image is preferably one in which the resin serves as a binder and the pigment is dispersed and contained therein.

The expression "including a fabric and an image adherent to some or all of the fabric and including a pigment and a resin" means that an image including a pigment and a resin is adherent so as to have excellent rubbing fastness.

<Resin>

The resin includes a product (C) of reaction between an acrylic/styrene polymer (A) having a carboxy group and an oxazoline-group-containing compound (B). The acrylic/styrene polymer (A) having a carboxy group is explained. The acrylic/styrene polymer (A) having a carboxy group is referred to also as polymer (A).

Examples of monomers (e.g., styrene-based monomers and (meth)acrylic monomers) to be used for forming the polymer (A) include the same monomers as those for use in forming the acrylic/styrene polymer having carboxy groups which is a preferred embodiment of the resin of the resin emulsion particles as a constituent component of the ink of the present invention. The specific examples are omitted here.

The acrylic/styrene polymer in the polymer (A) is a copolymer of an acrylic monomer and a styrene-based monomer. The polymer (A) is only required to include constituent units derived from a (meth)acrylic monomer and constituent units derived from a styrene-based monomer, and may contain constituent units other than those constituent units. However, the total content of the constituent units derived from a (meth)acrylic monomer and the constituent units derived from a styrene-based monomer, with respect to 100 mass % in total of all the constituent units constituting the polymer (A), is preferably 50 mass % or higher, more preferably 80 mass % or higher, still more preferably 95 mass % or higher, especially preferably 100 mol %.

The content of the constituent units derived from a styrene-based monomer, in the polymer (A), is not particularly limited. However, the content thereof with respect to 100 mass % in total content of the constituent units derived from a (meth)acrylic monomer and the constituent units derived from a styrene-based monomer, is preferably 1 to 55 mass %, more preferably 5 to 50 mass %, still more preferably 10 to 45 mass %. In cases when the content of the styrene-based monomer is within that range, the article with a printed image and the article with an adhered image are apt to be articles (e.g., printed textiles) having excellent texture or excellent washing fastness.

The content of carboxy groups in the polymer (A) is preferably 0.06 to 3 mass % with respect to 100 mass % of the polymer (A). The carboxy groups are preferably carboxy groups derived from (meth)acrylic acid. Hence, the polymer (A) is more preferably one containing constituent units derived from (meth)acrylic acid. In the polymer (A), the content of the constituent units derived from (meth)acrylic acid, with respect to 100 mass % in total content of the constituent units derived from a (meth)acrylic monomer and the constituent units derived from a styrene-based monomer, is preferably 0.1 to 5 mass %, more preferably 0.2 to 4 mass %, still more preferably 1 to 3 mass %.

The polymer (A) preferably further contains constituent units derived from a (meth)acrylic acid ester. Especially preferably, the polymer (A) contains constituent units derived from an alkyl (meth)acrylate and/or constituent units derived from a hydroxyalkyl (meth)acrylate. More preferably, the polymer (A) contains both constituent units derived from an alkyl (meth)acrylate and constituent units derived from a hydroxyalkyl (meth)acrylate.

In the constituent units derived from an alkyl (meth) acrylate, the alkyl groups contained therein preferably include alkyl groups having 1 to 18 carbon atoms, more preferably include alkyl groups having 4 to 12 carbon atoms. Also preferred is an embodiment in which the alkyl groups include two or more kinds of alkyl groups differing in the number of carbon atoms. Examples thereof include: an embodiment in which the alkyl groups include an alkyl group having 1 to 5 carbon atoms and an alkyl group having 6 to 18 carbon atoms; an embodiment in which the alkyl groups include the alkyl group having one carbon atom and an alkyl group having 8 to 18 carbon atoms; an embodiment in which the alkyl groups include the alkyl group having one carbon atom, an alkyl group having 4 to 6 carbon atoms, and an alkyl group having 8 to 18 carbon atoms; and an embodiment in which the alkyl groups include an alkyl group having 2 to 6 carbon atoms and an alkyl group having 8 to 12 carbon atoms. In the constituent units derived from a hydroxyalkyl (meth)acrylate, the hydroxyalkyl groups are preferably ones having 1 to 18 carbon atoms, more preferably ones having 2 to 4 carbon atoms.

The constituent units in the polymer (A) may include constituent units other than the constituent units derived from a (meth)acrylic monomer and the constituent units derived from a styrene-based monomer. Examples of the other constituent units include constituent units derived from monomers such as acrylonitrile, vinyl acetate, and acrylamide.

The oxazoline-group-containing compound (B) is explained. The oxazoline-group-containing compound (B) and preferred embodiments thereof are the same as the oxazoline-group-containing compound contained in the ink of the present invention and the preferred embodiments thereof, and the explanations given above can apply here. Explanations thereon are hence omitted.

The product (C) of reaction between the polymer (A) and the oxazoline-group-containing compound (B) is explained. The reaction product (C) is yielded by the reaction of carboxy groups of the polymer (A) with oxazoline groups of the oxazoline-group-containing compound (B). Preferably, the reaction product (C) has amidoester bonds formed by the reaction. The content of the amidoester bonds is not particularly limited, but is 0.05 to 5 mass % with respect to 100 mass % of the resin. The content thereof is more preferably 0.1 to 3 mass %. The content of the reaction product (C) in the resin is not particularly limited, but is preferably 0.1 to 50 mass % in ratio with respect to 100 mass % of the resin. The content thereof is more preferably 0.2 to 40 mass %, still more preferably 0.3 to 30 mass %.

The resin preferably further includes the polymer (A) besides the reaction product (C). The inclusion of the polymer (A) is apt to enable the fabric to have excellent texture. The content of the polymer (A) in the resin is preferably 50 to 99.9 mass % in ratio with respect to 100 mass % of the resin. The lower limit is more preferably 60 mass % or higher, still more preferably 70 mass % or higher, and the upper limit is more preferably 99.8 mass % or less, still more preferably 99.7 mass % or less, yet still more preferably 99 mass % or less.

The resin may further contain an oxazoline-group-containing compound (B). The content of the polymer (B) in the resin is preferably 0 to 5 mass % in ratio with respect to 100 mass % of the resin. The content thereof is more preferably 0 to 2 mass %, still more preferably 0 to 1 mass %.

<Pigment>

The pigment and preferred embodiments thereof are the same as the pigment as a constituent component of the ink of the present invention and the preferred embodiments thereof, and the explanations given above can apply here. Explanations thereon are hence omitted.

<Printed Image and Adhered Image>

The printed image and the adhered image each include the resin and the pigment.

The total content of the resin and pigment in the printed image and adhered image is preferably 80 to 100 mass % in ratio with respect to 100 mass % of the image. The total content thereof is more preferably 90 to 100 mass %, still more preferably 95 to 100 mass % or higher.

The content of the resin in the printed image and adhered image is preferably 20 to 95 mass % in ratio with respect to 100 mass % of the image. The content thereof is more preferably 25 to 90 mass %, still more preferably 30 to 85 mass %.

The printed image may have been printed on some or all of the fabric.

The adhered image may have been adhered to some or all of the fabric.

The printed image and the adhered image are each not particularly limited in the thickness thereof. However, the thickness thereof is preferably 0.1 to 1,000 μm, more preferably 0.3 to 500 μm, still more preferably 0.5 to 100 μm. Values of the thickness measured by an examination with, for example, a laser microscope can be employed.

<Fabric>

A definition of the fabric in the article with a printed image and article with an adhered image of the present invention and specific usable materials are the same as those explained hereinabove in "Method for producing Fabric having Printed Image", and the explanations given above can apply here. Preferred embodiments thereof are also the same. That is, preferred are fabrics respectively including cotton, polyester fibers, and polypropylene fibers. More preferred are a fabric including cotton as a main component, a fabric including polyester fibers as a main component, and a fabric including polypropylene fibers as a main component.

The article with a printed image of the present invention and the article with an adhered image of the present invention have been explained.

The article with a printed image of the present invention has excellent rubbing fastness even when the heat treatment step during printing was conducted at a low temperature. Preferred modes of the heat treatment step are the same as those described hereinabove in the section of the printed-matter production method of the present invention.

The article with an adhered image of the present invention has excellent rubbing fastness.

The expression "having excellent rubbing fastness" means that when the article is subjected to a dry rubbing test and a wet rubbing test according to the method as provided for in JIS L0849 using a type-II testing machine and undyed standard cloth of cotton No. 3-1 under the conditions of a load of 200 g and 100 reciprocations and is thereafter evaluated with a discoloration/fading gray scale, then the rating is grade 3-4 or higher in both the dry rubbing test and the wet rubbing test.

The article with a printed image of the present invention and the article with an adhered image of the present invention can be produced using, for example, an especially preferred embodiment of the ink for ink-jet textile printing of the present invention. In doing so, it is preferred to employ the method of the present invention for producing a fabric having a printed image or the transfer printing method for producing a fabric having a printed image.

EXAMPLES

The present invention is explained in more detail below by reference to Examples, but the present invention is not limited to the Examples only. "Parts" means "parts by mass" and "%" means "mass %", unless otherwise indicated.

The following measuring methods and evaluation methods were used.

<Average Particle Diameter of Resin Emulsion Particles>

The average particle diameter of resin emulsion particles was determined by examining the resin emulsion with a particle size distribution analyzer (product No. FPAR-1000, manufactured by Otsuka Electronics Co., Ltd.) based on the dynamic light scattering method and employing a value obtained from the examination by the cumulant method.

<Average Particle Diameter of Pigment>

The average particle diameter of a pigment was determined by examining a dispersion of the pigment with a particle size distribution analyzer (product No. FPAR-1000, manufactured by Otsuka Electronics Co., Ltd.) based on the dynamic light scattering method and employing a value obtained from the examination by the cumulant method.

<Viscosity of Ink>

The inks obtained in the Examples and Comparative Examples were each examined with E-type viscometer TPE-100 (manufactured by Toki Sangyo Co., Ltd.) under the conditions of rotor R24, 0.8 degrees, and 25° C.

<Storage Stability of Ink>

The inks obtained in the Examples and Comparative Examples were each enclosed in a sealed vessel and stored in a 50° C. thermostatic chamber for 30 days, and were then evaluated in accordance with the following criteria.

⊙: Viscosity change through the storage was less than 5%.

○: Viscosity change through the storage was 5 to 10%.

Δ: Viscosity change through the storage was 11 to 20%.

x: The ink gelled during the storage.

<Ejection Stability>

The inks obtained in the Examples and Comparative Examples were each introduced into textile printer MMP-TX13, manufactured by Mastermind Co., Ltd., and subjected to nozzle-check printing (in which ruled lines were printed by ejecting the ink successively from all the 180 nozzles) on a PET film, and the print was visually evaluated for deflection (deviation) and missing dots. Furthermore, the head was capped and allowed to stand still for one week and was then used to conduct the nozzle-check printing again, and the print was visually evaluated for deflection (deviation) and missing dots. The inks rated as Δ or x were insufficient in ejection stability.

⊙: No deflected (deviated) dot and no missing dot in the initial printing and after one week.

○: One or two deflected (deviated) dots or missing dots in the worse of the initial printing and after-one-week printing.

Δ: Three or four deflected (deviated) dots or missing dots in the worse of the initial printing and after-one-week printing.

x: Five or more deflected (deviated) dots or missing dots in the worse of the initial printing and after-one-week printing.

<Rubbing Fastness>

The fabrics having images printed thereon obtained in the Examples and Comparative Examples were each subjected to a dry rubbing test and a wet rubbing test according to the method as provided for in JIS L0849 using a type-II testing machine and undyed standard cloth of cotton No. 3-1 under the conditions of a load of 200 g and 100 reciprocations and thereafter evaluated with a discoloration/fading gray scale. With respect to Example 7, which was a white ink, the ink was printed on a cotton fabric (cotton-100% black T-shirt manufactured by Hanes, Inc.) and this fabric was evaluated. The fabrics having printed images rated as Δ or x were insufficient in rubbing fastness.

⊙: Grade 4-5 or higher grade in both the dry rubbing test and the wet rubbing test.

○: Grade 3-4 to grade 4 in both the dry rubbing test and the wet rubbing test.

Δ: Grade 2-3 to grade 3 in both the dry rubbing test and the wet rubbing test.

x: Grade 2 or lower grade in either the dry rubbing test or the wet rubbing test.

<Washing Fastness>

The fabrics having images printed thereon obtained in the Examples and Comparative Examples were each subjected ten times to ordinary washing with a domestic washing machine (washing conditions: washing in normal mode→rinsing→dehydration→drying; liquid detergent Ariel (manufactured by P&G Co.) was used) and evaluated for the degree of fading with a discoloration/fading gray scale.

⊙: Grade 4-5 to grade 5.

◯: Grade 3-4 to grade 4.

Δ: Grade 2-3 to grade 3.

x: Grade 2 or lower grade.

<Texture>

The fabrics having images printed thereon obtained in the Examples and Comparative Examples were each evaluated by touch.

⊙: The fabric having a printed image readily bent and had softness close to that of the original fabric.

◯: The fabric having a printed image readily bent but felt slightly stiffer than the original fabric.

Δ: The fabric having a printed image felt stiff.

x: The fabric having a printed image was too hard to be bent freely.

Emulsion Production Examples

Emulsion Production Example 1

Deionized water was introduced, in an amount of 252 parts, into a flask equipped with a dropping funnel, stirrer, nitrogen introduction tube, thermometer, and reflux condenser. A pre-emulsion for dropping composed of 437 parts of deionized water, 80 parts of a 25% aqueous solution of an emulsifier (trade name ADEKA REASOAP SR-10, manufactured by ADEKA Corp.). 25 parts of acrylic acid, 565 parts of 2-ethylhexyl acrylate, 50 parts of cyclohexyl methacrylate, 10 parts of hydroxyethyl methacrylate, and 350 parts of styrene was prepared, and 44 parts of the pre-emulsion, which corresponded to 3% of all the monomer components, was put in the dropping funnel and introduced into the flask. While nitrogen gas was being gently fed thereinto, the temperature was elevated to 80° C. and 30 parts of 5% aqueous ammonium persulfate solution was added to initiate polymerization. Thereafter, the remainder of the pre-emulsion for dropping and 30 parts of 5% aqueous ammonium persulfate solution were evenly dropped into the flask over 240 minutes. After completion of the dropping, the contents of the flask were held at 80° C. for 180 minutes, and 25% ammonia water and deionized water were added thereto to thereby adjust the pH to 8.5 and the solid content to 50% and terminate the polymerization. The obtained liquid reaction mixture was cooled to room temperature and then filtered with a 300-mesh metal sieve, thereby obtaining an emulsion. The emulsion resin particles had a styrene monomer content of 35% and a Tg of –21° C., and the emulsion had an average particle diameter of 200 nm.

Emulsion Production Example 2

An emulsion was obtained in the same manner as in Emulsion Production Example 1, except that 7 parts of the pre-emulsion for dropping, which corresponded to 0.5% of all the monomer components, was introduced into the flask. The emulsion resin particles had a styrene monomer content of 35% and a Tg of –21° C., and the emulsion had an average particle diameter of 310 nm.

Emulsion Production Example 3

An emulsion was obtained in the same manner as in Emulsion Production Example 1, except that 87 parts of the pre-emulsion for dropping, which corresponded to 6% of all the monomer components, was introduced into the flask. The emulsion resin particles had a styrene monomer content of 35% and a Tg of –21° C., and the emulsion had an average particle diameter of 140 nm.

Emulsion Production Example 4

An emulsion was obtained in the same manner as in Emulsion Production Example 1, except that the amount of styrene in the pre-emulsion for dropping was changed to 50 parts and 300 parts of methyl methacrylate was newly added. The emulsion resin particles had a styrene monomer content of 5% and a Tg of –20° C., and the emulsion had an average particle diameter of 200 nm.

Emulsion Production Example 5

An emulsion was obtained in the same manner as in Emulsion Production Example 1, except that the amount of cyclohexyl methacrylate in the pre-emulsion for dropping was changed to 0 part and the amount of styrene was changed to 200 parts. The emulsion resin particles had a styrene monomer content of 20% and a Tg of –22° C., and the emulsion had an average particle diameter of 210 nm.

Emulsion Production Example 6

An emulsion was obtained in the same manner as in Emulsion Production Example 1, except that the amount of 2-ethylhexyl acrylate in the pre-emulsion for dropping was changed to 465 parts, the amount of cyclohexyl methacrylate was changed to 0 part, and the amount of styrene was changed to 500 parts. The emulsion resin particles had a styrene monomer content of 50% and a Tg of –5° C., and the emulsion had an average particle diameter of 200 nm.

Pigment Dispersion Production Examples

Pigment Dispersion Production Example 1

Three parts of dispersant Joncryl 687 (manufactured by BASF A.G.), 1.3 parts of dimethylaminoethanol, and 81 parts of deionized water were stirred and mixed at 70° C. Subsequently. 15 parts of blue pigment C.I. Pigment Blue 15:3 (LIONOL BLUE FG-7330, manufactured by Toyo Ink Mfg. Co., Ltd.) and 0.1 part of surfactant Olfin D-10PG (manufactured by Nissin Chemical Industry Co., Ltd.) were dispersed with a bead mill using zirconia beads with a particle diameter of 0.5 mm charged in an amount of 50% in terms of volume proportion. The resultant mixture was filtered with a filter having a pore diameter of 1 μm (MCP-1-C10S, manufactured by Advantec Co., Ltd.), thereby obtaining a blue-pigment dispersion having a pigment content of 15%. The dispersion had an average particle diameter of 90 nm.

Pigment Dispersion Production Example 2

The same procedure as in Pigment Dispersion Production Example 1 was conducted, except that the blue pigment was replaced by metal-free C.I. Pigment Blue 16 (manufactured by Tokyo Kasei Kogyo Co., Ltd.), thereby obtaining a blue-pigment dispersion having a pigment content of 15%. The dispersion had an average particle diameter of 95 nm.

Pigment Dispersion Production Example 3

Five parts of dispersant Discoat N-14 (manufactured by Dai-ichi Kogyo Seiyaku Co., Ltd.), 6 parts of propylene glycol, 70 parts of deionized water, and 100 parts of titanium oxide CR-95 (manufactured by Ishihara Sangyo Kaisha, Ltd.) were dispersed with a ball mill using zirconia beads with a particle diameter of 0.5 mm charged in an amount of 50% in terms of volume proportion. Thus, a white-pigment dispersion having a pigment content of 55% was obtained. The dispersion had an average particle diameter of 330 nm.

EXAMPLES

Example 1

(Production of Ink)

Thirty parts (15 parts in terms of emulsion-particle amount) of the emulsion obtained in Emulsion Production Example 1, 23 parts (15 parts in terms of pigment amount) of the pigment dispersion obtained in Pigment Dispersion Production Example 1, 1.2 parts (0.3 parts in terms of solid amount) of Epocros WS-700 (manufactured by Nippon Shokubai Kagaku Kogyo Co., Ltd.; solid content. 25%), 2 parts of diethylene glycol monobutyl ether. 15 parts of triethylene glycol, 0.3 parts of surfactant KF-6011 (manufactured by Shin-Etsu Chemical Co., Ltd.), and 28.5 parts of deionized water were mixed together. The mixture was filtered with a filter having a pore diameter of 1 μm (MCP-1-C10S, manufactured by Advantec Co., Ltd.), thereby producing an ink (1).

(Image Formation by Ink-Jet Printing)

The ink (1) thus obtained was introduced into ink-jet textile printer MMP-TX13, manufactured by Mastermind Co., Ltd., and solid printing was conducted with the blue ink on a cotton fabric (cotton-100% white T-shirt manufactured by Hanes. Inc.) under the conditions of 1,440 dpi×1.440 dpi, set printing speed 8, and 120 mm×120 mm, thereby forming an image on the fabric. The fabric having the image formed thereon was subjected to a 90-second heat treatment with a 110° C. hot-air drying oven, thereby obtaining a fabric (1) having a printed image.

Examples 2 to 13 and Comparative Examples 1 to 8

Inks (2) to (13) of Examples 2 to 13 and inks (c1) to (c8) of Comparative Examples 1 to 8 were produced in the same manner as in Example 1, except that the kinds and amounts of the feed materials in (Production of Ink) in Example 1 were changed as shown in Tables 1 to 3 and that the feed amount of deionized water was regulated so as to result in a total amount of 100 parts. The oxazoline-group-containing compound, carbodiimide-group-containing compound, and blocked isocyanate compound which were used and are shown in Tables 1 to 3 are Epocros WS-700 (manufactured by Nippon Shokubai Co., Ltd.; solid content. 25%), Carbodilite SV-02 (manufactured by Nisshinbo Chemical Inc.; solid content 40%), and Byhydur BL2867 (manufactured by Sumika Covestro Urethane Co., Ltd.; solid content, 38%), respectively.

Next, the inks of the Examples and Comparative Examples were used to form images by ink-jet printing in the same manner as in Example 1, thereby obtaining fabrics (2) to (13) and fabrics (c1) to (c8), which each had an image formed thereon. The kinds of fabrics and heat treatment conditions used in the Examples and Comparative Examples were as shown in Tables 1 to 3.

The polyester fabric used was polyester-100% white T-shirt manufactured by Gunze Ltd. The polypropylene fabric used was a fabric composed of polypropylene-100% fibers. The fabrics (2) to (13) and the fabrics (c1) to (c8) are ones each having a printed image and obtained by conducting image formation by ink-jet printing in the same manner as in Example 1 and then conducting a heat treatment under the heat treatment conditions shown in Tables 1 to 3 in the same manner as in Example 1.

In Tables 1 to 3 are shown the inks produced in the Examples and Comparative Examples, the ink-jet properties, and the results of evaluating the fabrics having printed images.

TABLE 1

| | Example 1 | Example 2 | Example 3 | Example 4 | Example 5 | Example 6 | Example 7 |
|---|---|---|---|---|---|---|---|
| Emulsion Production Example | 1 | 1 | 1 | 1 | 2 | 5 | 1 |
| Pigment Dispersion Production Example | 1 | 1 | 1 | 1 | 1 | 1 | 2 |
| <Content (mass %) in 100-mass % ink> Pigment | 3.5 | 3.5 | 3.5 | 3.5 | 3.5 | 3.5 | 16 |
| Resin emulsion particles | 15 | 11 | 15 | 15 | 15 | 15 | 11 |
| a1) Oxazoline-group-containing compound | 0.3 | 0.3 | 0.6 | 0.1 | 0.3 | 0.3 | 0.2 |
| a2) Carbodiimide-group-containing compound | — | — | — | — | — | — | — |
| a3) Blocked isocyanate compound | — | — | — | — | — | — | — |
| Triethylene glycol | 15 | 15 | 15 | 15 | 15 | 15 | 15 |
| <Proportion> (a1-a3)/resin emulsion particles (mass %) | 2 | 2.7 | 4 | 0.7 | 2 | 2 | 1.8 |

TABLE 1-continued

| | Example 1 | Example 2 | Example 3 | Example 4 | Example 5 | Example 6 | Example 7 |
|---|---|---|---|---|---|---|---|
| <Resin emulsion particles> Average particle diameter (nm) | 200 | 200 | 200 | 200 | 310 | 210 | 200 |
| Styrene content (mass %) based on total monomer amount | 35 | 35 | 35 | 35 | 35 | 20 | 35 |
| <Image formation> Kind of fabric | cotton | cotton | cotton | cotton | cotton | cotton | cotton |
| Period of 110° C. heating (sec) | 90 | 90 | 90 | 90 | 90 | 90 | 90 |
| <Evaluation results> Viscosity (mPa · s) | 5 | 4 | 4 | 4 | 5 | 5 | 6 |
| Storage stability | ⊙ | ⊙ | ⊙ | ⊙ | ⊙ | ⊙ | ⊙ |
| Ejection stability | ⊙ | ⊙ | ⊙ | ⊙ | ⊙ | ⊙ | ⊙ |
| Rubbing fastness | ○ | ○ | ○ | ○ | ○ | ○ | ○ |
| Washing fastness | ⊙ | ⊙ | ○ | ○ | ⊙ | ⊙ | ⊙ |
| Texture | ⊙ | ⊙ | ⊙ | ⊙ | ⊙ | ⊙ | ○ |

TABLE 2

| | Example 8 | Example 9 | Example 10 | Example 11 | Example 12 | Example 13 |
|---|---|---|---|---|---|---|
| Emulsion Production Example | 1 | 1 | 1 | 1 | 4 | 6 |
| Pigment Dispersion Production Example | 1 | 1 | 1 | 3 | 1 | 1 |
| <Content (mass %) in 100-mass % ink> Pigment | 3.5 | 3.5 | 3.5 | 3.5 | 3.5 | 3.5 |
| Resin emulsion particles | 15 | 15 | 15 | 15 | 15 | 15 |
| a1) Oxazoline-group-containing compound | 0.3 | 0.3 | 0.3 | 0.3 | 0.3 | 0.3 |
| a2) Carbodiimide-group-containing compound | — | — | — | — | — | — |
| a3) Blocked isocyanate compound | — | — | — | — | — | — |
| Triethylene glycol | 15 | 15 | 15 | 15 | 15 | 15 |
| <Proportion> (a1-a3)/resin emulsion particles (mass %) | 2 | 2 | 2 | 2 | 2 | 2 |
| <Resin emulsion particles> Average particle diameter (nm) | 200 | 200 | 200 | 200 | 200 | 200 |
| Styrene content (mass %) based on total monomer amount | 35 | 35 | 35 | 35 | 5 | 50 |
| <Image formation> Kind of fabric | polyester | polyester | polypropylene | polypropylene | cotton | cotton |
| Period of 110° C. heating (sec) | 90 | 60 | 90 | 90 | 90 | 90 |
| <Evaluation results> Viscosity (mPa · s) | 5 | 5 | 5 | 5 | 5 | 5 |
| Storage stability | ⊙ | ⊙ | ⊙ | ⊙ | ⊙ | ⊙ |
| Ejection stability | ⊙ | ⊙ | ⊙ | ⊙ | ⊙ | ⊙ |
| Rubbing fastness | ⊙ | ○ | ⊙ | ⊙ | ○ | ○ |
| Washing fastness | ⊙ | ⊙ | ⊙ | ⊙ | Δ | ⊙ |
| Texture | ⊙ | ⊙ | ⊙ | ⊙ | ⊙ | X |

TABLE 3

| | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|
| Emulsion Production Example | 1 | 1 | 1 | 1 | 3 | 3 | 1 | 1 |
| Pigment Dispersion Production Example | 1 | 1 | 1 | 1 | 1 | 1 | 1 | 1 |
| <Content (mass %) in 100-mass % ink> Pigment | 3.5 | 3.5 | 3.5 | 3.5 | 3.5 | 3.5 | 3.5 | 3.5 |
| Resin emulsion particles | 8 | 22 | 15 | 15 | 15 | 15 | 15 | 15 |
| a1) Oxazoline-group-containing compound | 0.2 | 0.3 | — | 2 | 0.3 | 0.3 | — | — |
| a2) Carbodiimide-group-containing compound | — | — | — | — | — | — | 0.5 | — |
| a3) Blocked isocyanate compound | — | — | — | — | — | — | — | 0.5 |
| Triethylene glycol | 15 | 15 | 15 | 15 | 15 | 3 | 15 | 15 |
| <Proportion> (a1-a3)/resin emulsion particles (mass %) | 2.5 | 1.4 | 0 | 13 | 2 | 2 | 3.3 | 3.3 |
| <Resin emulsion particles> Average particle diameter (nm) | 200 | 200 | 200 | 200 | 140 | 140 | 200 | 200 |
| Styrene content (mass %) based on total monomer amount | 35 | 35 | 35 | 35 | 35 | 35 | 35 | 35 |
| <Image formation> Kind of fabric | cotton | cotton | cotton | cotton | cotton | cotton | cotton | cotton |
| Period of 110° C. heating (sec) | 90 | 90 | 90 | 90 | 90 | 90 | 90 | 90 |
| <Evaluation results> Viscosity (mPa · s) | 4 | 8 | 4 | 8 | 8 | 4 | 5 | 5 |
| Storage stability | ⊙ | ○ | ⊙ | ○ | Δ | Δ | X | ○ |
| Ejection stability | ⊙ | Δ | ⊙ | ⊙ | Δ | X | X | ⊙ |
| Rubbing fastness | Δ | ○ | Δ | Δ | ○ | ○ | Δ | X |
| Washing fastness | ○ | ⊙ | Δ | Δ | ⊙ | ⊙ | Δ | X |
| Texture | ⊙ | ⊙ | ⊙ | ⊙ | ⊙ | ⊙ | ⊙ | ⊙ |

As Tables 1 and 2 show, the inks (1) to (13) respectively obtained in Examples 1 to 13 each had excellent ejection stability and the fabrics (1) to (13), which had images printed with the respective inks by an ink-jet printer, each had excellent printed-image rubbing fastness although the heat treatment conditions had been 110° C. and 90 seconds or 110° C. and 60 seconds.

Furthermore, the fabrics (1) to (13) respectively obtained in Examples 1 to 13 were each a fabric having a printed image adhered thereto and had excellent rubbing fastness.

INDUSTRIAL APPLICABILITY

The ink for ink-jet textile printing of the present invention can be used as an ink for ink-jet textile printing which, when used in ink-jet textile printing, not only gives printed images having excellent rubbing fastness even when the ink-jet textile printing is conducted at low heating temperatures but also has excellent ejection stability.

The invention claimed is:

1. An ink for ink-jet textile printing which comprises a pigment, resin emulsion particles, an oxazoline-group-containing compound, and an aqueous medium, wherein
    the resin emulsion particles have an average particle diameter of 150 nm or larger,
    the resin emulsion particles are contained in 10 to 20 mass % with respect to 100 mass % of the ink for ink-jet textile printing, and
    the oxazoline-group-containing compound is contained in 0.5 to 10 mass % with respect to 100 mass % of the resin emulsion particles.

2. The ink according to claim 1, wherein the resin emulsion particles have a carboxy group.

3. The ink according to claim 1, wherein the resin emulsion particles comprise an acrylic/styrene polymer.

4. The ink according to claim 1, wherein the resin emulsion particles comprise an acrylic/styrene polymer having a carboxy group.

5. The ink according to claim 1, wherein the oxazoline-group-containing compound comprises a water-soluble oxazoline-group-containing compound.

6. The ink according to claim 1, wherein the oxazoline-group-containing compound comprises an oxazoline-group-containing polymer.

7. A method for producing printed matter in which an image is printed on a fabric, the method comprising forming an image in which the ink for ink-jet textile printing according to claim 1 is adhered to the fabric with an ink-jet printer.

8. A transfer textile printing method for producing printed matter comprising:
    ejecting the ink for ink-jet textile printing according to claim 1 onto a transfer base so that the transfer base having an image is formed;
    superposing the transfer base on a fabric;
    heating and/or pressed the transfer base superposed on the fabric to transfer the image to the fabric; and peeling the transfer base from the fabric to which the image has been transferred.

9. An article with a printed image, obtained by forming the printed image from the ink for ink-jet textile printing according to claim 1 on some or all of a fabric, wherein the printed image comprises a pigment and a resin, and the resin comprises a product (C) of reaction between an acrylic/styrene polymer (A) having a carboxy group and an oxazoline-group-containing compound (B).

10. An article with an adhered image, comprising a fabric and the image, the image being adherent to some or all of the fabric and including a pigment and a resin, wherein the image is formed from the ink for ink-jet textile printing according to claim 1, wherein the resin includes a product (C) of reaction between an acrylic/styrene polymer (A) having a carboxy group and an oxazoline-group-containing compound (B).

11. A textile printing method for producing printed matter comprising ink-jet printing an ink on a fabric, wherein the ink comprises a pigment, resin emulsion particles, an oxazoline-group-containing compound, and an aqueous medium, the resin emulsion particles have an average particle diameter of 150 nm or larger, the resin emulsion particles are contained in 10 to 20 mass % with respect to 100 mass % of the ink for ink-jet textile printing, and the oxazoline-group-containing compound is contained in 0.5 to 10 mass % with respect to 100 mass % of the resin emulsion particles.

12. The textile printing method according to claim 11, wherein the textile printing method is a transfer textile printing method.

* * * * *